J. S. HECHT AND A. T. DOWDELL.
OBTURATOR RING.
APPLICATION FILED MAY 17, 1916.
1,378,109. Patented May 17, 1921.
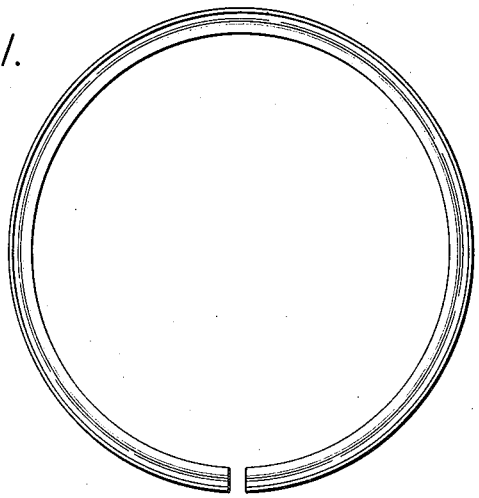
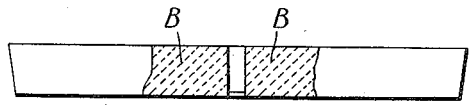
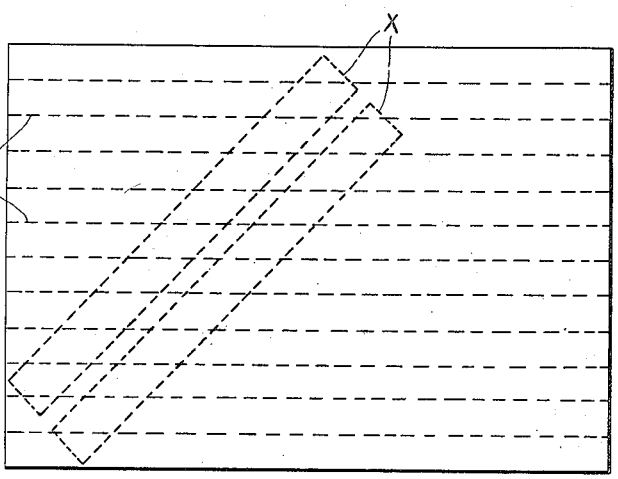
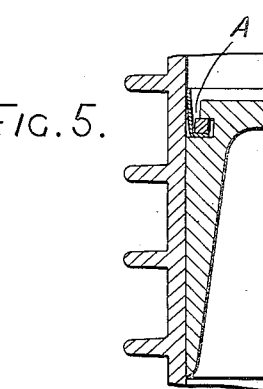
Inventors
John Sebastian Hecht and
Albert Thomas Dowdell
By Carl P. Goebel
their Attorney

UNITED STATES PATENT OFFICE.

JOHN S. HECHT AND ALBERT T. DOWDELL, OF ST. ALBANS, ENGLAND.

OBTURATOR-RING.

1,378,109.  Specification of Letters Patent.  Patented May 17, 1921.

Application filed May 17, 1916. Serial No. 98,073.

*To all whom it may concern:*

Be it known that we, JOHN SEBASTIAN HECHT, residing at "The Chalet," Russell Avenue, St. Albans, in the county of Hertford, England, and ALBERT THOMAS DOWDELL, residing at 20 Brampton road, St. Albans, in the county of Hertford, England, both subjects of the King of Great Britain, have invented certain new and useful Improvements in Obturator-Rings, of which the following is a specification.

This invention relates to improvements in obturator rings of the kind used for piston packing in some engines with rotary cylinders but their use is not confined to this type of engine.

The chief object of the present invention is to make a ring less liable to fracture or warping when exposed to heat, mechanical strain or the like.

Obturator rings have hitherto generally been made by pressing or spinning, or a combination of both methods from metal disks or sheets. This resulted in the angle which the grain of the metal makes with the axis of the ring varying from point to point in the periphery of the ring, the total variation being 90°. It follows, therefore, that the grain of the metal in some parts of such rings would be what is generally known as "short" and liable to fracture, also such rings had a tendency to expand unequally when subjected to heat.

In the accompanying drawing;—

Figure 1 shows the plan of one form of an obturator ring,

Fig. 2 shows diagrammatically an elevation of the same,

Fig. 3 shows a cross-section (on a greatly enlarged scale) taken radially at any part of the ring, Fig. 4 shows diagrammatically a sheet of metal from which the ring may be made according to our invention, and Fig. 5 shows one of these rings fitted in the piston of an engine in the known manner.

According to our invention we make our ring from a strip of metal which for example we may procure by cutting a sheet of metal as shown in Fig. 4 in the direction shown by the dotted lines X,—the dotted lines Y representing the direction of the grain of the metal—the strip being bent or formed into a ring. By so doing the grain of the metal is exactly or approximately at the same angle to the axis of the ring at all parts of its circumference. In the process of manufacture the ring is provided with a flange or lip D, Fig. 3.

If we make this angle 45° for example as indicated by the lines B Fig. 2, the grain of the metal will give strength to the ring in the angle marked A shown in Fig. 3, also the ring is at the same time strong to resist fracture in other directions, the grain, being in no place "short".

It will be noted that in the type of ring illustrated, the metal forming by far the greater part of the ring, has undergone very little distortion or straining.

Also the present invention has other advantages as follows:—

Less metal is required for the manufacture, there being practically no waste.

Generally no annealing is required and the hardness of the finished product is regulable.

The metal is less distorted and strained during manufacture. The ring is therefore stronger.

The grain of the metal can be so arranged that strength is secured where required.

The tendency to straighten out, that is, the expansive spring in the ring made according to our invention can be regulated and made much stronger, than in a ring of the usual type.

It is obvious that strips can be prepared having the grain in relation to their length either parallel or at any desired angle.

It is also obvious that rings according to this invention can be made from tubes, which latter can be made by curving and joining sheets of metal in which the grain of the metal is arranged either parallel or at any desired angle with regard to the axis of the tube.

Portions of the requisite width are then cut from the tube, at, or approximately at, right angles to the length of said tube and the lip D Fig. 3 formed at one end of each portion. The ring thus formed is then cut through preferably at the joint.

In such rings it is obvious that the grain is at all points at the same or approximately the same angle in regard to the axis of the ring, and the effect as regards the grain of the metal would be the same as if the rings were simply made from strip as hereinbefore described.

The uniformity and the direction of the grain at all points about the axis of the ring produces a ring not especially subject to fracture at any particular point, and as the grain is at no point "short" it is less liable to fracture than those rings heretofore in use in which the grain was "short" at some points. As the ring according to the present invention is uniform at all points, variation due to temperature changes will also be uniform so that the ring will always maintain its shape and function accurately in use. For instance, if the grain of the metal extended at right angles to the axis of the ring throughout the body thereof, in the flexing of the wall of the ring relative to the cylinder wall there would be much greater liability to fracture of the ring along the line of the grain than is the case in my invention wherein the metal of the grain runs diagonally relative to the axis of the ring. This is particularly true at the juncture of the body-wall of the ring with the inwardly extending flange, which point is the theoretical fulcrum for the body-wall in its flexing movements.

What we claim is:—

1. An obturator ring comprising a strip of metal having its grain extending diagonally of its length.

2. An obturator ring comprising an annulus of sheet metal having its grain extending at an angle relative to the axis of the ring.

3. An obturator ring comprising a strip of metal having the grain so arranged that it is at the same or approximately the same angle with regard to the axis of the ring at all parts of the circumference thereof.

4. An obturator ring comprising a metal strip in which the grain of the metal is at a predetermined angle with reference to the length of the strip, the resultant angle of the grain with reference to the axis of the ring being substantially the same at all points.

5. An obturator ring comprising a metal annulus in which the grain of the metal is at a predetermined angle with reference to the axis of the annulus, the resultant angle of the grain with reference to the angle of the ring being substantially the same at all points.

6. An obturator ring comprising a strip of metal, said strip having its grain extending diagonally of its length, and an inwardly extending flange or lip formed on said ring, said diagonal direction of the grain adapted to give strength to said ring in the angle formed at the flange.

7. An obturator ring comprising an annulus having an inwardly extending lip or flange on one of its edges, the grain of the metal at the juncture of the flange with the body of the annulus being diagonally disposed relatively to the axis of the ring.

J. S. HECHT.
A. T. DOWDELL.